(12) United States Patent
Nachtrab et al.

(10) Patent No.: US 10,157,084 B2
(45) Date of Patent: *Dec. 18, 2018

(54) AUTOMATED PROVISIONING AND MANAGEMENT OF CLOUD SERVICES

(71) Applicant: ConnectWise, Inc., Tampa, FL (US)

(72) Inventors: Matthew Nachtrab, Tampa, FL (US); Donald McCallum, Tampa, FL (US); Anthony J. Zerilli, Riverview, FL (US)

(73) Assignee: ConnectWise, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,417

(22) Filed: Sep. 29, 2016

(65) Prior Publication Data

US 2017/0083379 A1    Mar. 23, 2017

Related U.S. Application Data

(63) Continuation of application No. 13/562,015, filed on Jul. 30, 2012, now Pat. No. 9,477,530.

(Continued)

(51) Int. Cl.
*G06F 15/177* (2006.01)
*G06F 9/50* (2006.01)
(Continued)

(52) U.S. Cl.
CPC ........ *G06F 9/5072* (2013.01); *G06F 21/6218* (2013.01); *H04L 41/0876* (2013.01);
(Continued)

(58) Field of Classification Search
CPC ....... H04L 63/10; H04L 63/08; H04L 67/125; H04L 67/2804; G06F 9/5072; G06F 21/6218
(Continued)

(56) References Cited

U.S. PATENT DOCUMENTS 6,574,617 B1    6/2003    Immerman et al.
6,785,721 B1    8/2004    Immerman et al.
(Continued)

FOREIGN PATENT DOCUMENTS

EP    18/83030    1/2008
EP    1883030 A1 *    1/2008    ............. G06F 21/31

OTHER PUBLICATIONS

Business Wire, Jamcracker Cloud Service Brokerage Enablement Solution to Be Showcased at Mobile World Congress, press release, Feb. 14, 2011, Barcelona, Spain.
(Continued)

*Primary Examiner* — Oleg Survillo
(74) *Attorney, Agent, or Firm* — Foley and Lardner LLP

(57) ABSTRACT

A system for managing the provisioning of cloud based services includes a collection module, a configuration module, a licensing module and a set up module. The collection module automatically obtains and stores information from end user machines that relevant to the provisioning of the could-based services. The configuration module uses the obtained information to automatically configure the use of the cloud based services. The licensing module automatically configures the account and licensing information allowing an end-user machine to access the cloud based services. The setup module automatically configures the end user machines to access and use the cloud-based services.

20 Claims, 13 Drawing Sheets

Related U.S. Application Data

(60) Provisional application No. 61/513,115, filed on Jul. 29, 2011.

(51) Int. Cl.

| | | |
|---|---|---|
| *H04L 29/08* | (2006.01) | |
| *G06F 21/62* | (2013.01) | |
| *H04L 12/24* | (2006.01) | |
| *H04L 29/06* | (2006.01) | |

(52) U.S. Cl.
CPC .......... *H04L 63/145* (2013.01); *H04L 67/125* (2013.01); *H04L 67/16* (2013.01); *H04L 67/2804* (2013.01); *H04L 63/08* (2013.01); *H04L 63/10* (2013.01)

(58) Field of Classification Search
USPC .................................. 709/203, 220, 223, 224
See application file for complete search history.

(56) References Cited

U.S. PATENT DOCUMENTS

| | | | |
|---|---|---|---|
| 6,854,016 | B1 | 2/2005 | Kraenzel et al. |
| 7,441,263 | B1 | 10/2008 | Bakshi et al. |
| 7,991,662 | B2 | 8/2011 | Landau et al. |
| 8,095,624 | B2 | 1/2012 | Epstein et al. |
| 8,171,414 | B2 | 5/2012 | Hackworth |
| 8,180,909 | B2 | 5/2012 | Hartman et al. |
| 8,347,263 | B1 * | 1/2013 | Offer .................... G06F 8/71 717/104 |
| 8,819,113 | B2 | 8/2014 | Runcie et al. |
| 2003/0172138 | A1 | 9/2003 | McCormack et al. |
| 2004/0148257 | A1 | 7/2004 | Garcia |
| 2004/0201604 | A1 | 10/2004 | Kraenzel et al. |
| 2008/0043965 | A1 | 2/2008 | Cellini et al. |
| 2009/0249439 | A1 | 10/2009 | Olden et al. |
| 2010/0027552 | A1 | 2/2010 | Hill |
| 2010/0107085 | A1 | 4/2010 | Chadwick et al. |
| 2010/0115088 | A1 | 5/2010 | Sakai et al. |
| 2010/0250712 | A1 | 9/2010 | Ellison et al. |
| 2010/0325139 | A1 | 12/2010 | Frew et al. |
| 2011/0029882 | A1 | 2/2011 | Jaisinghani |
| 2011/0055385 | A1 | 3/2011 | Tung et al. |
| 2011/0055399 | A1 | 3/2011 | Tung et al. |
| 2011/0055712 | A1 | 3/2011 | Tung et al. |
| 2011/0153727 | A1 | 6/2011 | Li |
| 2011/0225500 | A1 | 9/2011 | Casalaina et al. |
| 2011/0238515 | A1 | 9/2011 | Diwakar |
| 2011/0252416 | A1 | 10/2011 | Kobayashi |
| 2011/0265147 | A1 | 10/2011 | Liu |
| 2011/0295727 | A1 | 12/2011 | Ferris et al. |
| 2012/0254293 | A1 | 10/2012 | Winter et al. |

OTHER PUBLICATIONS

Crawford, Steve, Cloud Services Brokerages—Enabling Service Providers to Drive New Revenue Streams and Increase Market Share, white paper from Jamcracker, May 4, 2012, Santa Clara, California.

Crawford, Steve, Jamcracker Services Delivery Network (JSDN) Service Provider Solution, white paper from Jamcracker, Nov. 29, 2010, Santa Clara, California.

Davis, David, Getting Started with Doyenz rCloud, white paper from Doyenz, Apr. 17, 2012, Bellevue, Washington.

Jamcracker, Jamcracker Cloud Service Brokerage Enablement Solution to be Showcased at TM Forum Management World, press release, May 23, 2011, Dublin, Ireland.

Jamcracker, Jamcracker Extends Multi-Tiered Distribution to Office 365 via the Jamcracker Services Delivery Network, press release, Jun. 28, 2011, Santa Clara, California.

Jamcracker, The Jamcracker Platform—Unifying Cloud Services Delivery and Management, white paper from Jamcracker, May 21, 2010, Santa Clara, California.

Light Reading, Jamcracker Shows Cloud Brokerage Solution, press release, Feb. 14, 2011, Barcelona, Spain.

Sarathy, Vijay, The Jamcracker Platform—Service Integration Overview and Adapter Developer Guide, technical documentation from Jamcracker, Aug. 11, 2010, Santa Clara, California.

Sarathy, Vijay, The Jamcracker Platform for Enterprises, marketing literature from Jamcracker, Jul. 1, 2010, Santa Clara, California.

U.S. Notice of Allowance on U.S. Appl. No. 13/562,015 dated Jul. 1, 2016.

U.S. Office Action on 103568-0102 dated Jan. 8, 2015.

U.S. Office Action on 103568-0102 dated Jul. 1, 2014.

* cited by examiner

AUTOMATED PROVISIONING AND MANAGEMENT OF CLOUD SERVICES

CROSS-REFERENCE TO RELATED PATENT APPLICATIONS

The present application is a continuation of and claims priority to U.S. patent application Ser. No. 13/562,015, filed Jul. 30, 2012, which claims priority to and the benefit of U.S. Provisional Patent Application No. 61/513,115, filed Jul. 29, 2011 entitled "Automated Provisioning And Management Of Cloud Services," the contents of each of which are incorporated by reference in their entireties.

TECHNICAL FIELD

The present invention generally relates to cloud services and service delivery, and more specifically to automating the provisioning, billing, and reporting of multiple cloud services from multiple vendors for multiple end users at multiple companies for a managed service provider. The provisioning function is implemented both on end user machines and at the cloud service provider.

BACKGROUND OF THE INVENTION

The use of cloud based services is rapidly growing in popularity. These services have advantages that make them extremely attractive to end users, and also make them easier to maintain from a management perspective. However, the vendors of these cloud based services all have different interfaces for setting up and managing them, which poses a challenge to the administrators responsible for keeping them working. As more end users look to outsource the management of their computing infrastructure, these challenges fall onto the shoulders of the outsourced service providers, where they are multiplied even further by the sheer number of end user systems involved.

Some existing systems help to automate the provisioning of the hardware for running the cloud services. Other existing systems can automate the provisioning of the software cloud services themselves, but only in a captive environment where the provisioning tools are built into the software at both the server and the client. Still other existing systems help to automate the provisioning of cloud service software from third party sources, but only if that software is either designed or modified to fit into a new "federation" or "schema".

Some popular existing systems that are in fairly wide use work with unmodified third party software, but does not provide any automation for setting up the end user systems to use the cloud services, and also requires manual effort for the management of each end user system. Some existing systems go further to automate at least some part of the management of multiple end user systems, but do not automate the gathering of any provisioning information from those end user systems, and often fall back to the requirement of modifying the cloud service software to conform to a new management API or "schema".

In addition to automating the provisioning and management of cloud services on large numbers of end user systems, outsourced service providers also need tools to help manage the complexity of the billing involved. They can often get volume discounts on the cloud services, but do not want to pass along the entire discount to their customer, but instead use the difference to help their own profit margins. Some existing systems provide consolidated billing of online services through an intermediary, but lack the ability to manage multiple companies and have no automation of the data gathering from end user systems needed to set up the billing infrastructure.

SUMMARY OF THE INVENTION

The present invention describes a system that solves the growing problem of managing the complexity of providing cloud based services to end users in a managed environment. In such an environment, an outsourced service provider must be able to provision (set up accounts and access for) multiple cloud services from multiple vendors, all with different interfaces. The outsourcer must also provision these services for multiple of their own customers, each with many end users having different requirements for the cloud services. The outsourcer must manage the billing process for these multiple customers, as well as monitoring the availability and performance of the cloud services. This requires the outsourcer to provide reports on these metrics to the customers. The present invention provides a way to automate the provisioning, monitoring, reporting, and billing for these cloud services.

It is clear that some of the required functions exist for management of multiple cloud services by multiple service providers for multiple end users at multiple companies, but some do not, and none are combined into the tool set that an outsourced service provider needs.

The present invention provides these functions, and gives some relief to the staggering magnitude of the task of managing these cloud services, by automating most of the work in a clean, easy to manage interface that works well for the outsourced service providers, the vendors of the cloud services, and the ultimate end users of those services.

DETAILED DESCRIPTION

Figure 1:
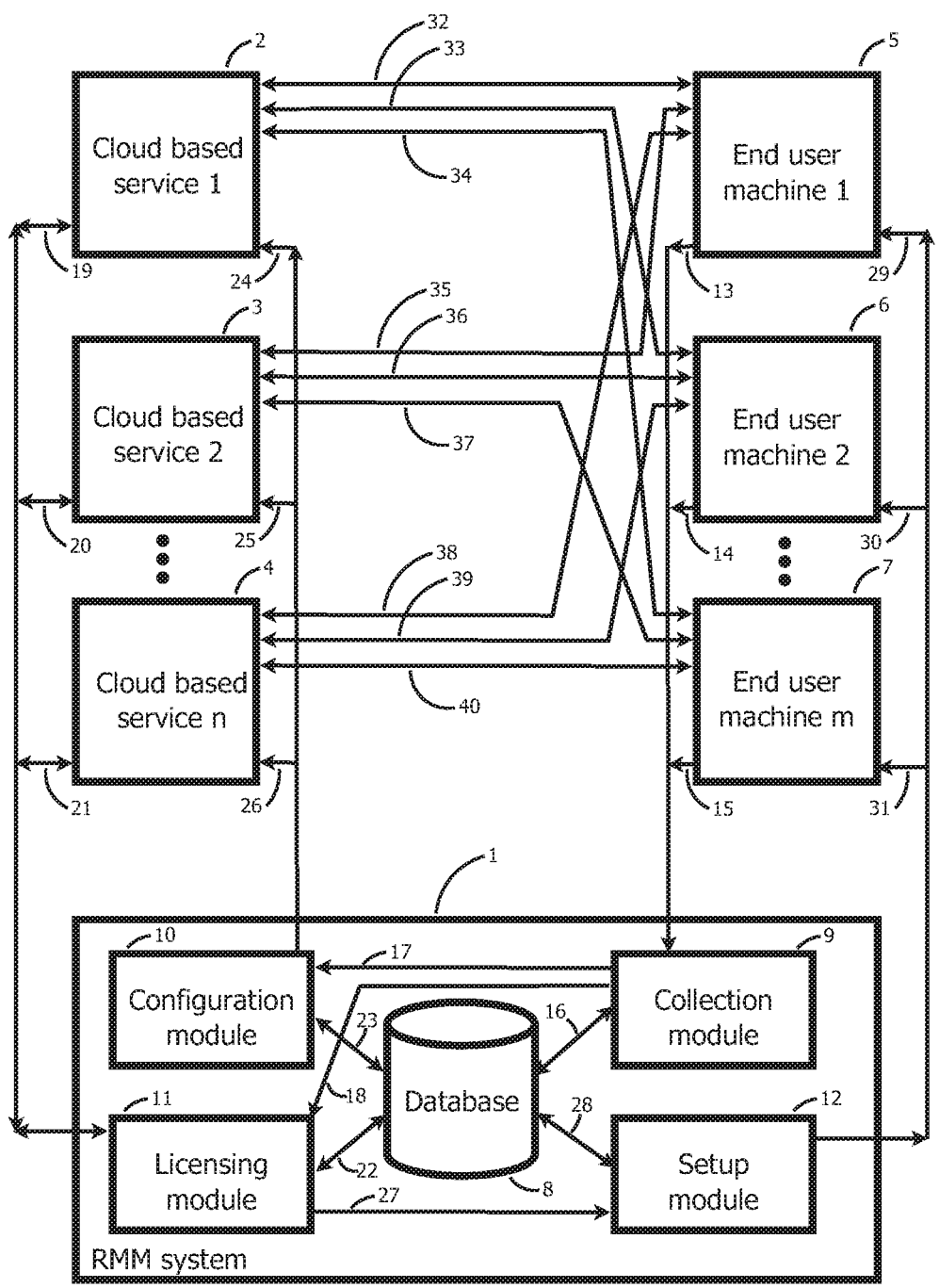
FIG. 1 is a block diagram of one embodiment of a system for managing cloud-based services.

FIG. 1 shows the overall architecture of the system. The system automates the setup and operation of the access and use of cloud based services 2-4 by end user machines 5-7. The Remote Monitoring and Management (RMM) system 1 does this automation using a set of modules described here. The collection module 9 retrieves 13-15 information from the end user machines 5-7. It stores 16 information in a database 8 and also makes information available 17-18 to a configuration module 10 and a licensing module 11. The licensing module 11 uses this information, and other information sources, to configure 19-21 the cloud based services 2-4 with account and licensing information needed to use the services. The licensing module 11 also accesses 22 the database 8, and in addition, makes information available 27 to the setup module 12. The configuration module 10 completes 24-26 all of the setup required on the cloud based services 2-4 that is required for the end user machines 5-7 to use them. The configuration module 10 has access 23 to the database 8 to complete this operation. The setup module 12 uses 28 the database 8 to configure 29-31 the end user machines 5-7 to correctly access and use the cloud based services 2-4. As a result, at the end of this process the end user machines 5-7 are able to properly use 32-40 the cloud based services 2-4.

Figure 2:
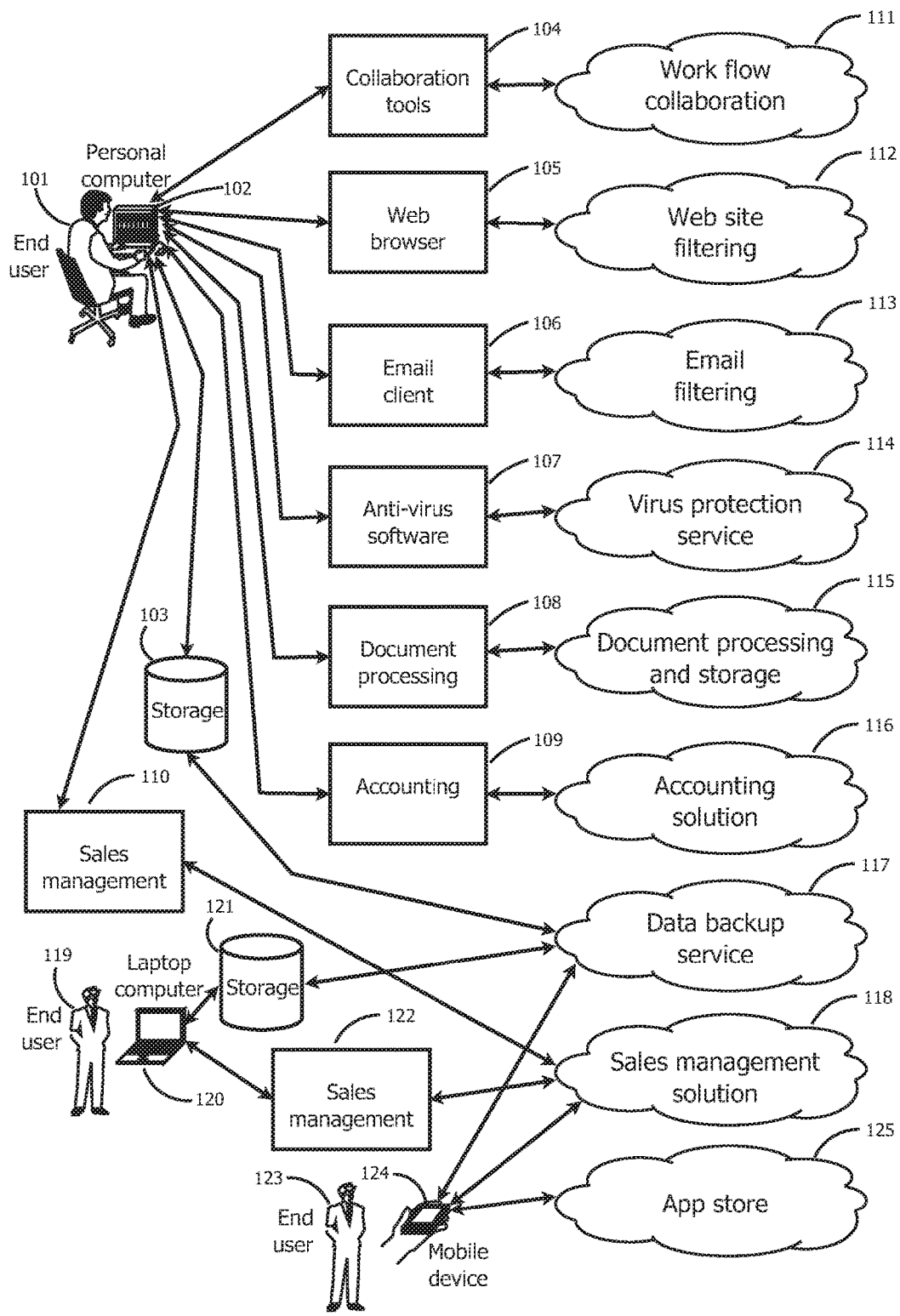
FIG. 2 is a block diagram showing one embodiment of how end users access cloud services.

FIG. 2 shows a representative configuration of cloud services in use by end users.

The end user 101 uses a personal computer 102 that contains local storage 103 and a number of applications that are cloud-enabled applications. The applications described here are intended to be representative, and not comprehensive.

The collaboration tools application 104 uses the work flow collaboration cloud service 111 to allow the end user 101 to create, organize, edit, share, update, and track documents, spreadsheets, databases, forms, presentations, and drawings, working either alone or jointly with other users around the world. This could be a cloud service such as Google Docs. A cloud based work flow collaboration service 111 allows easy and natural interaction with other online users, and also allows new features to be implemented and deployed in the cloud implementation with little effort or disruption to the end user 101.

The end user 101 uses a web browser 105 to access and control information on a wide variety of web sites. However, many kinds of sites may be inappropriate for the end user 101, due to the nature of the content or the presence of malicious intent in the site, so the web browser 105 is augmented with a component that uses a web filtering cloud service 112 to restrict or forbid access to certain web sites. This could be a cloud service such as FortiGuard web filtering. A cloud based web site filtering service 112 provides central management of the difficult task of keeping up with the evolving technology required for identifying and filtering inappropriate web sites.

Similarly, the end user 101 uses an email client 106 to communicate using email, but many email messages may be inappropriate, superfluous, annoying, or dangerous. To manage this, the email client 106 is augmented with a component that uses an email filtering cloud service 113 to eliminate or quarantine such email messages. This could be a cloud service such as the one from Barracuda Networks. A cloud based email filtering service 113 provides central management of the difficult task of keeping up with the evolving technology required for filtering unwanted email messages.

The personal computer 102 is vulnerable to a wide variety of threats such as viruses, trojans, worms, and malware. An anti-virus application 107 helps to protect the personal computer 102 from these threats and uses a virus protection cloud service 114 to keep updated. This could be a cloud anti-virus service such as Panda Cloud Office Protection offered by Panda Security. A cloud based virus protection service 114 provides central management of the difficult task of updating the anti-virus application 107 to contain and disable the rapidly growing assortment of malicious threats.

The accounting application 109 uses the accounting solution cloud service 116 to provide the end user 101 with an accurate and up-to-date accounting management solution. This could be a cloud service such as the NetSuite business accounting solution. A cloud based accounting solution 116 allows accounting management by multiple end users across the entire business, and also allows central management of complex accounting forms and tables that change frequently due to regulatory updates.

The document processing application 108 uses the document processing and storage cloud service 115 to allow the end user to create, organize, edit, store, and track documents, spreadsheets, databases, presentations, project plans, and drawings. This could be a cloud service such as Microsoft Office 365. A cloud based document cloud service 115 provides low-maintenance access for the end user 101 to licensing, updates, and data storage facilities.

The sales management application 110 uses the sales management solution cloud service 118 to help the end user 101 manage all aspects of the sales process, including contacts, leads, quotes, calendars, quotas, contracts, and forecasting. This could be a sales management cloud service such as the one provided by SalesForce.com. A cloud based sales management solution 118 provides simple and natural tracking, updating, and management of the sales process across the entire sales force for the company.

The data storage 103 of the personal computer 102 needs to be backed up safely and reliably to prevent the catastrophic loss of data in the event of a disabling hardware or software failure, user error, or malicious data destruction event. The cloud based data backup service 117 provides this capability using a lightweight agent on the personal computer 102. This could be a data backup service such as the one provided by Acronis. A cloud based data backup service 117 relieves the end user 101 from the burden of worrying about the details of managing the backup storage media and the scheduling of backup operations, and makes it much more likely that effective backup operations actually take place.

Cloud based solutions greatly facilitate the central management and sharing of company-wide data between end users. A second end user 119 with a laptop computer 120 having data storage 121 can use the same data backup cloud service 117 and the same sales management solution cloud service 118 with a different instance of the sales management application 122. Doing this gives the end user 119 the same powerful capabilities as those used by end user 101, with a relatively small incremental investment in effort and expense.

Cloud based solutions also enhance the effectiveness of a mobile work force. An end user 123 who is traveling can use a convenient mobile device 124 with apps set up to access and use the same data backup cloud service 117 and sales management solution cloud service 118, thereby gaining the same advantage in extended power with relatively small incremental investment. In addition, the installation and updates of the apps themselves is managed through a cloud based app store 125.

Figure 3:
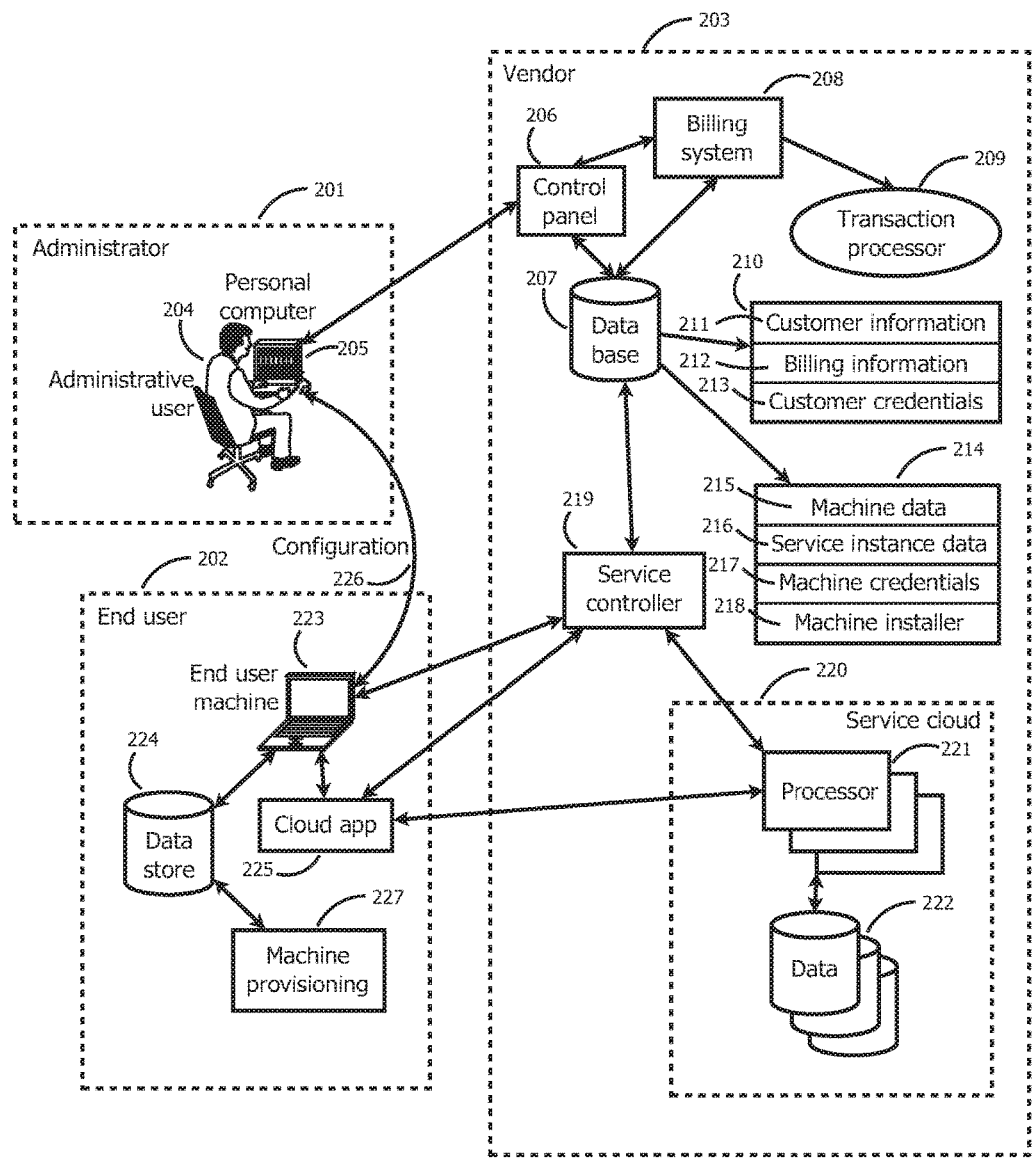
FIG. 3 is a block diagram of one embodiment of the components involved in provisioning a cloud service for making an end-user machine available for use.

FIG. 3 shows the process of provisioning (setting up) a cloud based service for an end user. The three participants in this process are the administrator 201, the vendor 203, and the end user 202. Note that these are logical divisions for clarity, and that in other embodiments of the system, any two or three of these logical entities can be the same physical entity. For example, the administrator 204 may be the same person as the end user 202, and the administrative personal computer 205 may be the same as the end user machine 223. Similarly, any one of these logical entities could be more than one physical entity. For example, the service cloud 220 made up of the processors 221 and data storage 222 could be a third party provider that is hired by the vendor 203.

The administrator 204 is the entity that is responsible for setting up and managing the cloud service for the end user 202. The end user 202 is the entity that is the ultimate beneficiary of the cloud service. The vendor 203 is the entity that provides the cloud service, and is typically a business that derives its revenue from providing the cloud service to a number of end users.

The first step in provisioning the cloud service is for the administrative user 204 to set up the customer data 210. This customer information applies to a group of end users 202 that are related and are managed by the administrator 201 as a single unit. For example, the customer information could apply to all end users 202 at a single company. The administrative user 204 sets up the customer data 210 using a control panel 206 provided by the vendor 203. The interface to the control panel 206 can be through a browser or a proprietary interface. The control panel 206 interacts with a vendor database 207 to set up and store the customer data 210. Some of the customer data 210 originates from the administrative user 204, and some of it is generated by the control panel 206 or the billing system 208. During the provisioning process, the database 207 is set up with the customer information 211 that identifies the customer and provides any operational information, such as contact information. The billing information 212 is also set up, and can include information such as account numbers and credit limits. The customer credentials 213 are also generated and set up; these are secret information such as a username and password that are used to authenticate the administrative user 204 in online transactions. During the setup of the billing information 212, the control panel 206 interacts with the billing system 208 used by the vendor, which in turn may need to interact with a transaction processor 209 that may provided by an outside vendor. For example, the billing system 208 may need to validate credit card information provided by the administrative user 204 by using a bank service.

The second step in provisioning the cloud service is for the administrative user 204 to set up the machine information 214. The administrative user 204 accesses the end user machine 223 that will use the cloud service and obtains relevant configuration information 226 about the end user machine 223. Using the control panel 206, the administrative user 204 provides this information, and as a result the control panel 206 updates the database 207 with the machine information 214. The machine information 214 contains machine data 215 associated with the end user machine 223, such as a serial number that identifies the machine. It also contains service instance data 216 that describes how the end user machine 223 will use the cloud service, such as what features will be available and how much storage is allocated. It also contains machine credentials 217; these are secret information such as a username and password that are used to authenticate the end user machine 223 when it needs to use the cloud service. Finally, the machine information 214 can contain a customized machine installer 218 that will be used for provisioning the end user machine 223. Note that in other embodiments of the system, the machine installer 218 may not be specific to a single end user machine 223, and may be stored with the customer data 210, or may even be stored externally to the database 207.

The third step in provisioning the cloud service is for the administrative user to access the machine installer 218, either through the control panel 206 or by other means, and apply it to the end user machine 223. The machine installer 218 could be embodied as executable code, a script to be interpreted, or even a list of instructions for the administrative user 204 to follow to manually set up the end user machine 223. During this process, the end user machine 223 updates its data store 224 to include the local machine provisioning information 227 that is necessary for the local cloud app 225 to use the service cloud 220.

Once the provisioning process is complete, the end user 202 can use the cloud app 225 on the end user machine 223. When the cloud app 225 needs to access the service cloud 220, it uses the machine provisioning information 227 in the local data store 224 to authenticate the end user machine 223 with the service controller 219. The service controller 219 uses the machine credentials 217 in the database 207 to verify the authentication of the end user machine 223, and also accesses the service instance data 216 to configure the services provided to the cloud app 225. The service controller 219 then provides services as needed using the processors 221 and data store 222 in the service cloud 220.

Figure 4:
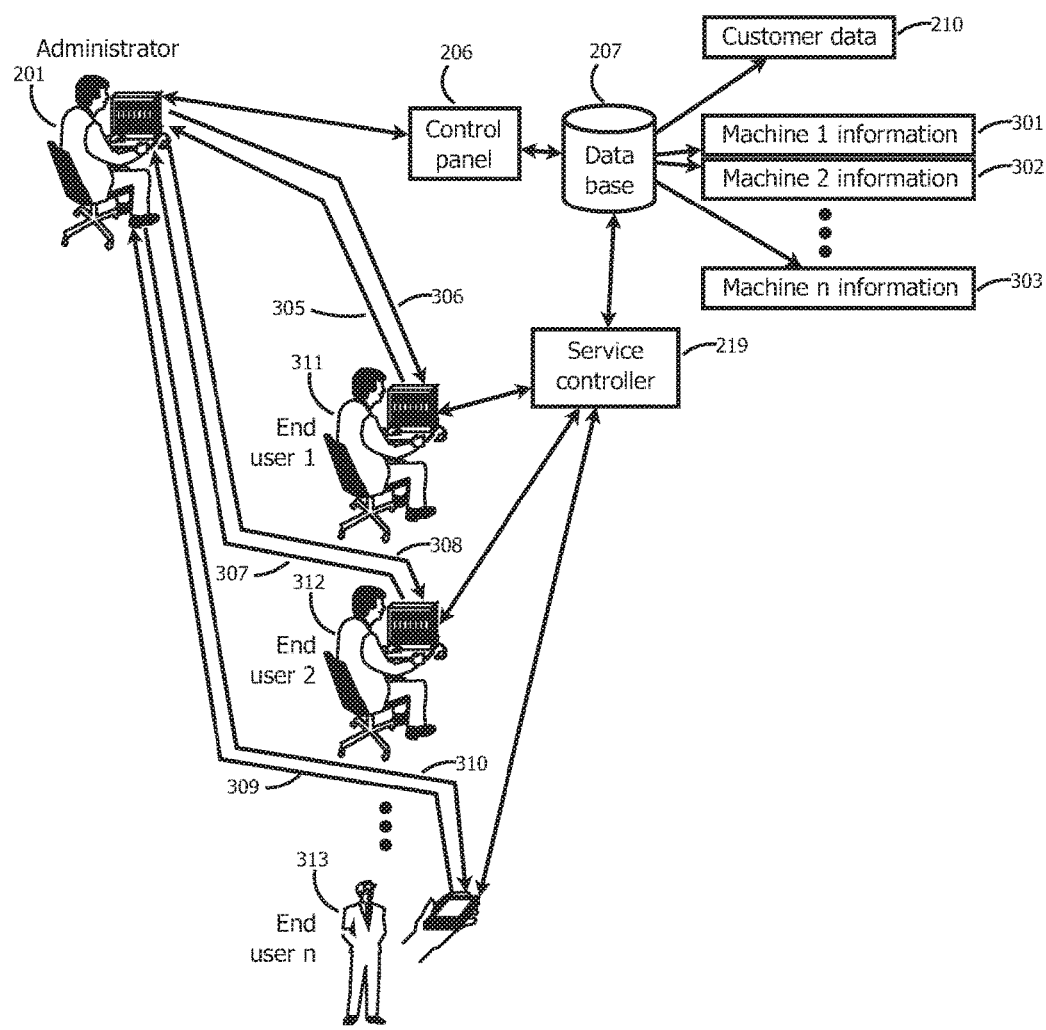
FIG. 4 is a block diagram illustrating one embodiment of the additional complexity of provisioning a cloud service for use by multiple employees in a single company.

FIG. 4 shows the extensions to FIG. 3 for cloud service provisioning in a company environment, where the administrator 201 is responsible for managing the use of the cloud service by a number of end users 311-313.

The first step of the process described for FIG. 3 is the same in FIG. 4, and needs no further elaboration.

In the second step of the process described for FIG. 3, in FIG. 4 the administrator 201 must repeat the operation of setting up the machine information 301-303 for the machine of each end user 311-313. For example, the administrator 201 must access the machine of end user 1 311 to obtain relevant configuration information 305, and use the control panel 206 to update the database 207 with the machine 1 information 301. Similarly, the administrator 201 then accesses the machine of end user 2 312 to obtain relevant configuration information 307, and uses the control panel 206 to update the database 207 with the machine 2 information 302. Similarly, the administrator 201 then accesses the machine of end user n 313 to obtain relevant configuration information 309, and uses the control panel 206 to update the database 207 with the machine n information 303. This step must be repeated for all the end users that are to use the cloud service.

In the third step of the process described for FIG. 3, in FIG. 4 the administrator must access the appropriate machine installer for each end user 311-313 and apply it to the appropriate machine. For example, the administrator 201 accesses the machine installer for the machine of end user 1 311, and applies it 306 to that machine. Similarly, the administrator 201 accesses the machine installer for the machine of end user 2 312, and applies it 308 to that machine. Similarly, the administrator 201 accesses the machine installer for the machine of end user n 313, and applies it 310 to that machine. This step must be repeated for all the end users that are to use the cloud service.

Once this provisioning process is completed for all end users, the end users 311-313 can use the cloud service by accessing the service controller 219, with the same process described for FIG. 3 repeated in FIG. 4.

Figure 5:
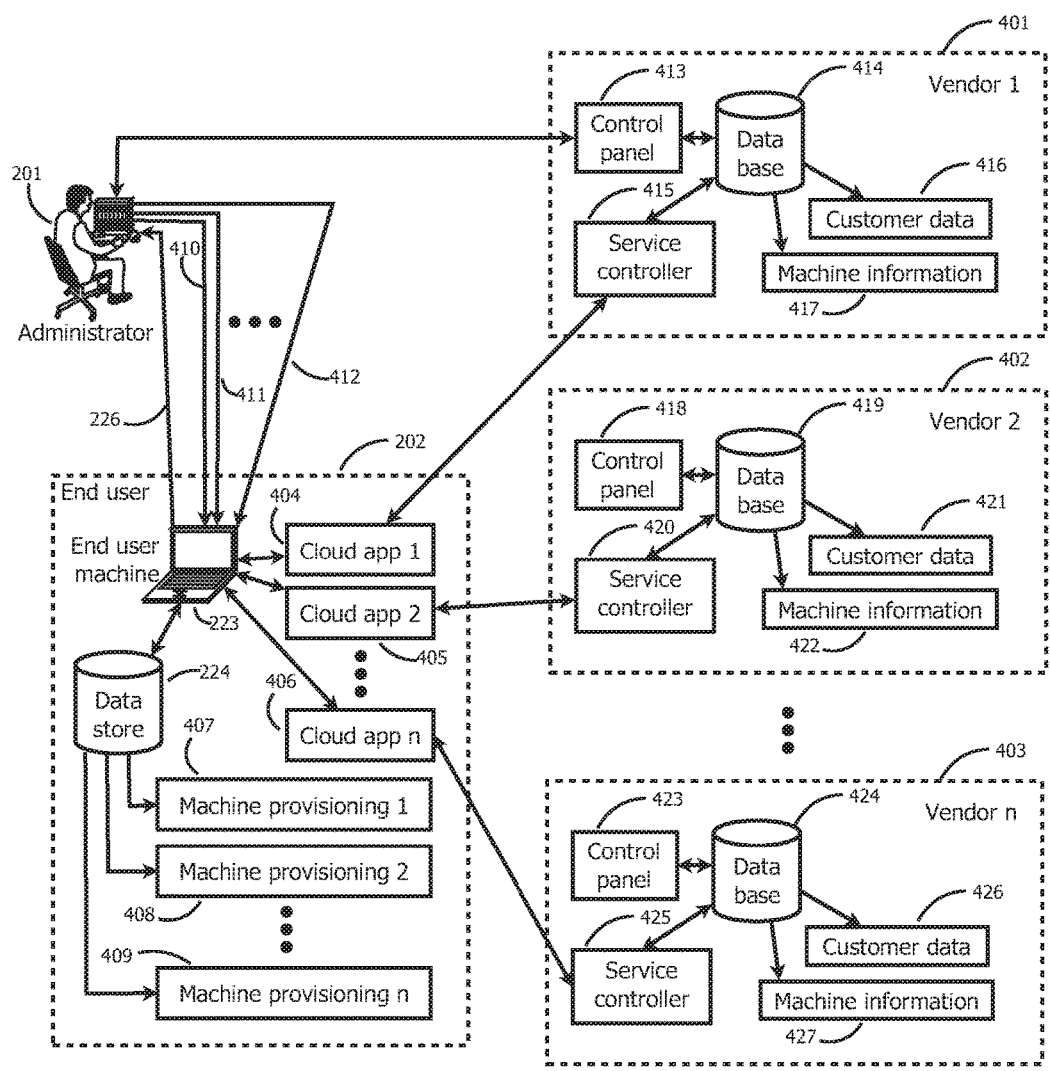
FIG. 5 is a block diagram illustrating one embodiment of the additional complexity of provisioning multiple cloud services from multiple vendors for a single end user.

FIG. 5 shows the extensions to FIG. 3 for cloud service provisioning in an environment where a single end user machine 223 is used with multiple cloud apps that use multiple cloud services. This is consistent with the description of FIG. 2, in which, for example, the personal computer 102 has multiple cloud apps 104-110 installed that use multiple cloud services 111-118.

In the first step of the process described for FIG. 3, in FIG. 5 the administrator 201 must repeat the operation of setting up the customer data 416, 421, 426 at all of the multiple vendors 401-403 providing the cloud services. For example, to set up vendor 1 401, the administrator 201 accesses the control panel 413 and provides customer information to it that the control panel 413 utilizes to set up the database 414 with the customer data 416. Similarly, to set up vendor 2 402, the administrator 201 accesses the control panel 418 and provides customer information to it that the control panel 418 utilizes to set up the database 419 with the customer data 421. Similarly, to set up vendor n 403, the administrator 201 accesses the control panel 423 and provides customer information to it that the control panel 423 utilizes to set up the database 424 with the customer data 426. This step must be repeated for all the vendors providing cloud services that will be used by the end user 202.

In the second step of the process described for FIG. 3, in FIG. 5 the administrator can access the end user machine 223 one time to obtain the configuration information 226 needed, but the administrator 201 must then use that information to set up the machine information 417, 422, 427 at all of the multiple vendors 401-403 providing the cloud services. For example, to set up vendor 1 401, the administrator 201 accesses the control panel 413 and provides the machine information to it that the control panel 413 utilizes to set up the database 414 with the machine information 417. Similarly, to set up vendor 2 402, the administrator 201 accesses the control panel 418 and provides the machine information to it that the control panel 418 utilizes to set up the database 419 with the machine information 422. Similarly, to set up vendor n 403, the administrator 201 accesses the control panel 423 and provides the machine information to it that the control panel 423 utilizes to set up the database 424 with the machine information 427. This step must be repeated for all the vendors 401-403 providing cloud services that will be used by the end user 202.

In the third step of the process described for FIG. 3, in FIG. 5 the administrator accesses the machine installer from each vendor 401-403 and applies it to the end user machine 223. For example, the administrator 201 accesses the machine installer from vendor 1 401 and applies it 410 to the end user machine 223, which updates the local data store 224 with the machine provisioning 1 407. Similarly, the administrator 201 accesses the machine installer from vendor 2 402 and applies it 411 to the end user machine 223, which updates the local data store 224 with the machine provisioning 2 408. Similarly, the administrator 201 accesses the machine installer from vendor n 403 and applies it 412 to the end user machine 223, which updates the local data store 224 with the machine provisioning n 409. This step must be repeated for all the vendors 401-403 providing cloud services that will be used by the end user 202.

Once this provisioning process is completed for all vendors 401-403, the end user 202 can use the cloud apps 404-406, which access the cloud services provided by the vendors 401-403, by communicating with the service controllers 415, 420, 425 at the vendors 401-403.

Figure 6:
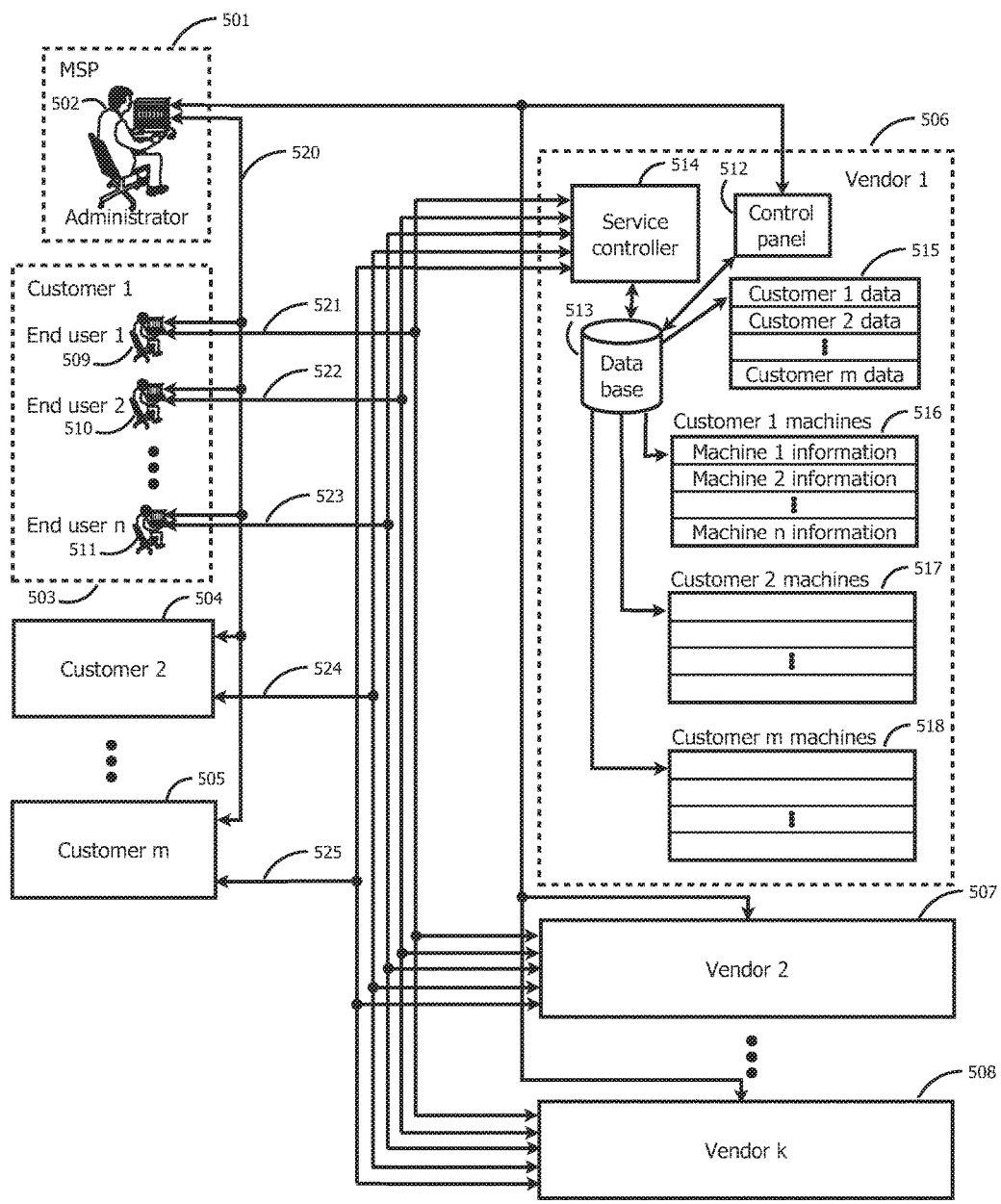
FIG. 6 is a block diagram illustrating one embodiment of the additional complexity encountered by a managed service provider (MSP) in provisioning a cloud service for multiple customers, each having multiple employees using the service.

FIG. 6 illustrates the use of cloud services in the MSP environment, which brings together the concepts illustrated in FIG. 2, FIG. 3, FIG. 4, and FIG. 5 and uses them in a more general fashion. The MSP, or Managed Service Provider 501, is in the business of selling IT (Information Technology) services to customers 503-505. Each customer has multiple end users 509-511 that are all managed by the MSP 501. As part of the services provided to customers, the MSP would like to offer the cloud services provided by multiple vendors 506-508. Therefore, the MSP 501 is faced with the considerations of FIG. 4 (multiple end users) and FIG. 5 (multiple vendors), along with the addition of multiple customers.

This fully general case requires the administrator 502 at the MSP 501 to use the control panel 512 to set up multiple customer data 515 in the database 513, and then repeat this step at each vendor 506-508. The administrator 502 must access configuration information 520 from the machine of each end user 509-511 at each customer 503-505, and use it with the control panel 512 at each vendor 506-508 to set up machine information for each customer 516-518. Then the administrator 502 must apply 520 the machine installer from each vendor 506-508 to the system of each end user 509-511 at each customer 503-505. Once this is complete, the end users 509-511 at each customer 503-505 can use the cloud services provided by the vendors 506-508 by connecting with the service controller 514 at each vendor 506-508. The end users of each customer connect independently 521-525 with the service controllers at the vendors 506-508.

However, the bookkeeping for this process that must be managed by the administrator 502 is enormous. Each customer may need a different subset of cloud services, and within a single customer, each end user may have different requirements for different cloud services. The amount of detail is so large that it is highly susceptible to human error, so the need for automation of the labor intensive processes is compelling and urgent. The present invention describes a system for largely automating the process of provisioning cloud services in this complex MSP environment.

Figure 7:
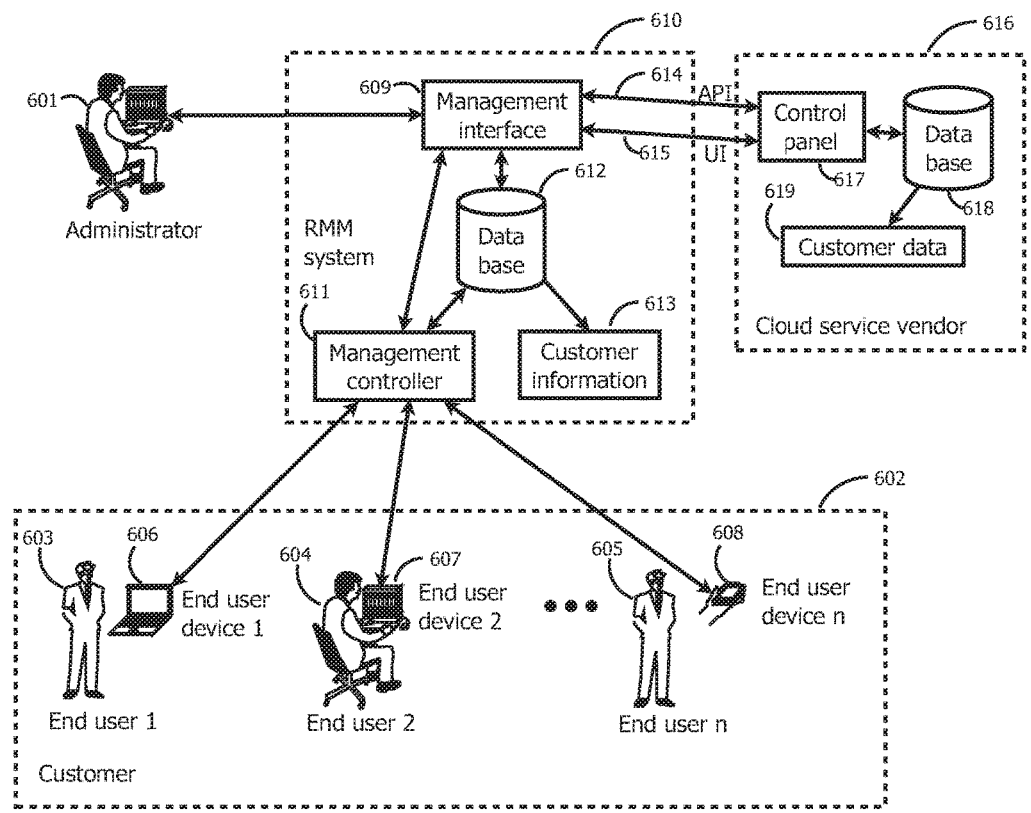
FIG. 7 is a block diagram of one embodiment of the components allowing the MSP to automatically gather customer data from the end user machines in order to help with the provisioning of a cloud service.

FIG. 7 illustrates the automation of the first step of the process described for FIG. 3. The administrator 601 provides IT services to a customer 602 with a number of end users 603-605 using end user devices 606-608. The administrator 602 uses a Remote Monitoring and Management (RMM) system 610 to help provide these services. The administrator 601 interacts with the RMM system 610 through a management interface 609 that allows the administrator to easily check the condition of the end user devices 606-608 and take actions on them. This is done through the management controller 611 which is connected to the end user devices 606-608. The management controller 611 receives status information from the end user devices 606-608 and provides control and configuration information to them, in a way that is automated and requires no manual effort on the part of either the administrator 601 or the end users 603-605.

The RMM system 610 uses a database 612 to manage all the data associated with the end user devices 606-608. This database 612 also contains customer information 613 about the customer 602. Some representative examples of the customer information 613 include contact information, billing information, service plan information, ticketing, and invoicing. Some of this information is entered by the administrator 601 through the management interface 609, but much of it is also entered and kept current automatically by the management controller 611, based on information it receives from the end users 603-605, or directly from the end user devices 606-608.

When the administrator 601 wants to provision a cloud service vendor 616 for the customer 602, the process is largely automated. Rather than interacting directly with the control panel 617, the administrator 602 initiates the operation on the RMM system 610 through the management interface 609. The management interface then interacts directly with the control panel 617 of the cloud service vendor 616, using either an Application Programming Interface (API) 614 designed for this interaction, or by mimicking the action of an end user through the normal User Interface (UI) 615. The management interface 609 has access to all of the customer information 613 in the database 612 in order to complete this operation, and is therefore able to provision the database 618 with the customer data 619 at the cloud service vendor 616. In addition, the management interface 609 receives all of the customer specific provisioning information back from the control panel 617, such as the customer credentials, and stores these in the customer information 613 of the RMM system 610, where it is available for future use.

Figure 8:
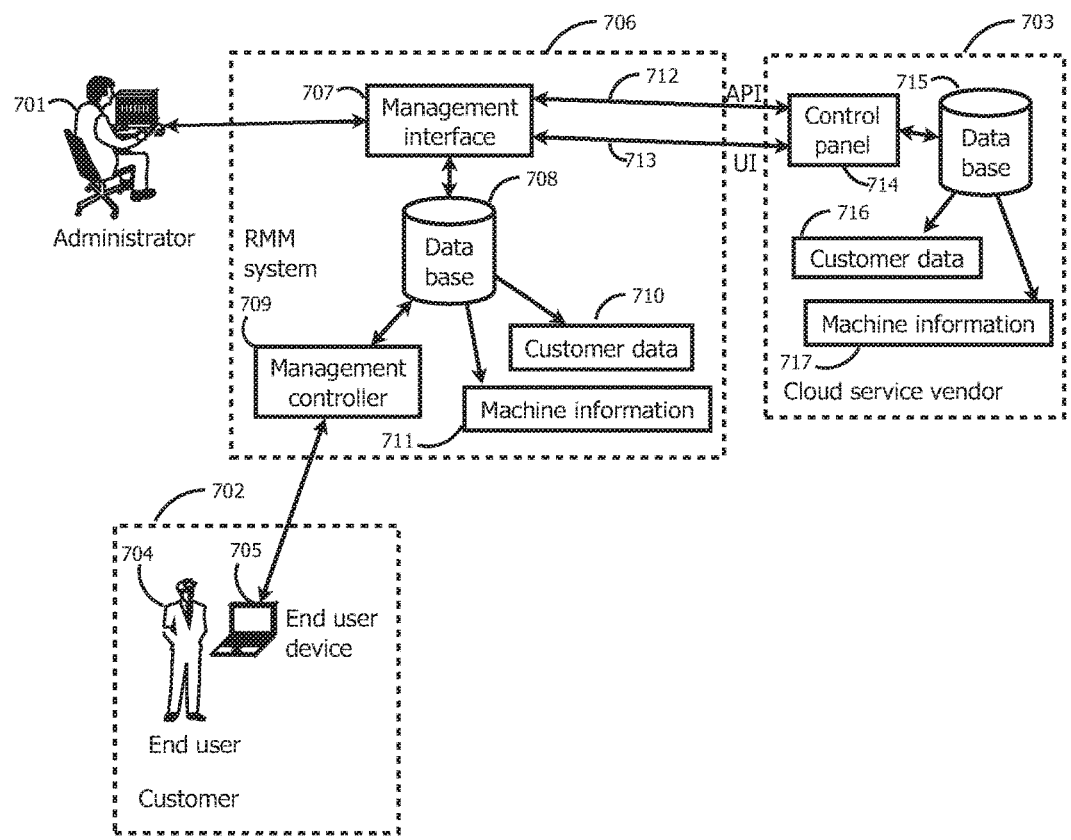
FIG. 8 is a block diagram of one embodiment of the components involved in the automation of the operations at the cloud vendor in order to complete the provisioning of a cloud service.

FIG. 8 illustrates the automation of the the second step of the process described for FIG. 3. The administrator 701 provides IT services to a customer 702 with an end user 704 using an end user device 705. The administrator 701 uses an RMM system 706 to provide these services and has provisioned the customer 702 at the cloud service vendor 703 using the process described for FIG. 7. As a result, the customer data 716 is already set up in the database 715 at the cloud service vendor 703, and the customer data 710 is already set up in the database 708 on the RMM system 706.

As a result of using the RMM system 706, the end user device 705 has provided status information to the management controller 709 which is stored in the machine information 711 of the database 708. This machine information 711 contains a very complete and accurate picture of the end user device 705, with no manual effort required on the part of either the administrator 701 or the end user 704.

When the administrator 701 wants to provision the cloud service from the vendor 703 for the machine 705, the process is largely automated. Rather than interact directly with the control panel 714, the administrator 701 initiates the process on the RMM system 706 using the management interface 707. The management interface then interacts directly with the control panel 714 of the cloud service vendor 703, using either an API 712 or mimicking an end user through operations on the UI 713. The management interface 707 uses customer data 710 from the database 708 to authenticate against the customer data 716 in the database 715 at the cloud service vendor 703. Then it provisions the end user device 705 at the cloud service vendor 703 using machine information 711 in the database 708 on the RMM system 706. As a result, the database 715 at the vendor 703 is updated with the required machine information 717 about the end user device 705. In addition, any provisioning information associated with the device 705 that is generated by the control panel 714 is returned back to the management interface 707 and is stored along with the machine information 711 in the database 708 on the RMM system 706, where it is available for future use.

Figure 9:
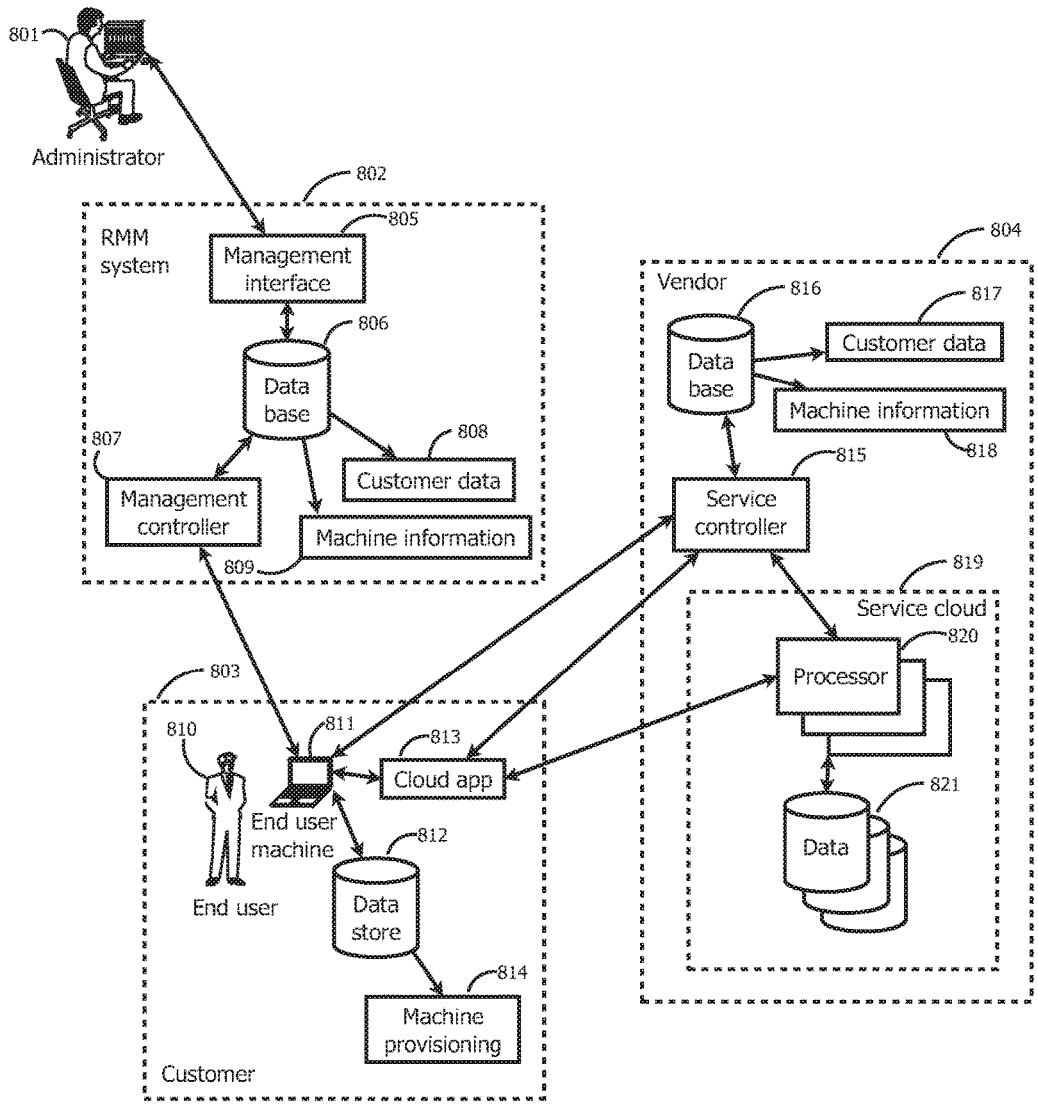
FIG. 9 is a block diagram of one embodiment of the components involved in the automation of the components on an end user machine in order to complete the provisioning of a cloud service.

FIG. 9 illustrates the automation of the third step of the process described for FIG. 3. The administrator 801 provides IT services to a customer 803 with an end user 810 using an end user machine 811. The administrator 801 uses an RMM system 802 to provide these services and has provisioned both the customer 803 and the end user machine 811 at the cloud service vendor 804 using the processes described for FIG. 7 and FIG. 8. As a result, the customer data 817 and machine information 818 are already set up in the database 816 at the vendor 804, and the customer data 808 and machine information 809 are set up in the database 806 on the RMM system 802.

When the administrator 801 wants to provision the end user machine 811 to use the cloud service from the vendor 804, the process is largely automated. Rather than interact with the vendor 804, the administrator 801 initiates the process on the RMM system 802 using the management interface 805. The management interface 805 then uses the customer data 808 and machine information 809 in the database 806 to prepare everything that is required for the provisioning process. Next, the management controller 807 uses this setup and applies it on the end user machine 811. As a result, the machine provisioning information 814 gets set up in the data store 812 of the machine, and the cloud app 813 is installed and configured. This is all done without manual intervention on the part of either the administrator 801 or the end user 810.

After the provisioning process is complete, the end user 810 can use the cloud app 813, which interacts with the service controller 815 at the vendor 804 using the machine provisioning information 814. The service controller 815 uses the customer data 817 and machine information 818 in the database 816 to authenticate the end user machine 811 and to set up the parameters for the cloud app 813 usage of the service cloud 819. The cloud app 813 then uses the processor resources 820 and data resources 821 of the service cloud 819 to implement its capabilities.

Figure 10:
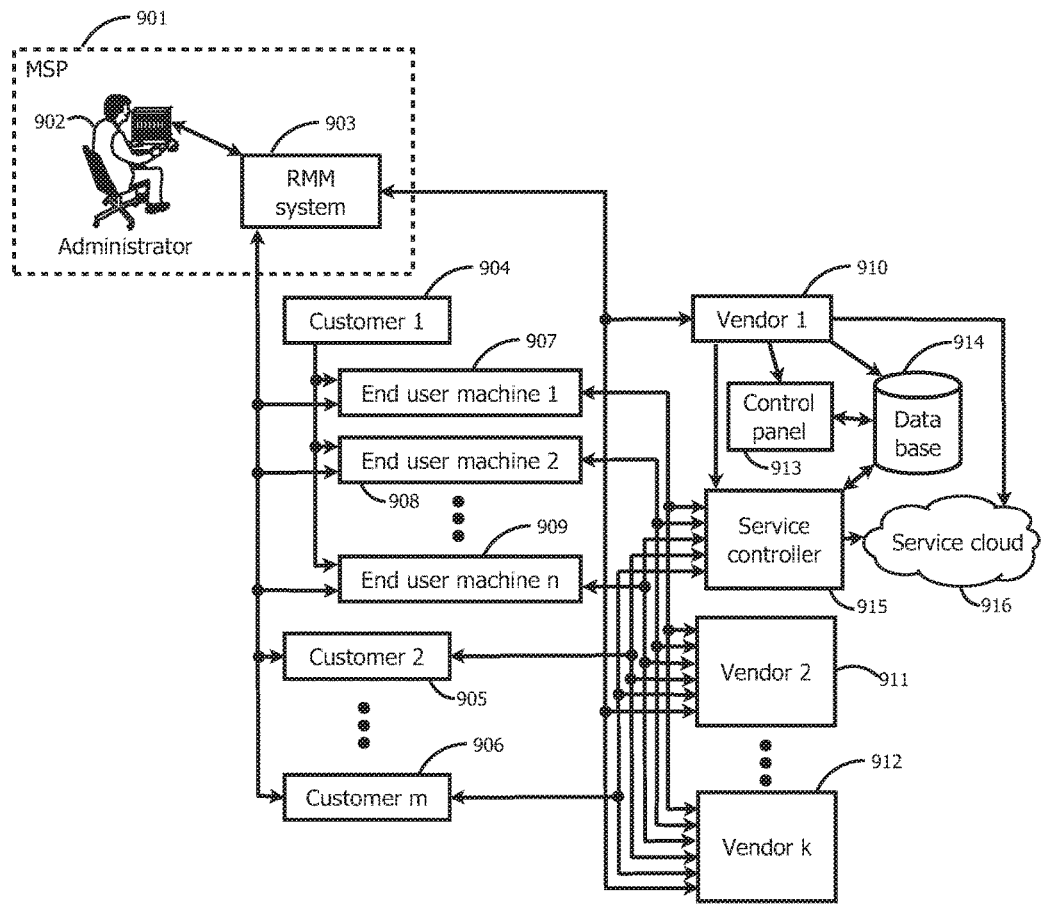
FIG. 10 is a block diagram illustrating one embodiment of data gathering from end user machines, automation on end user machines, automation at the cloud service vendors, and process management to provide simplified and convenient provisioning of multiple cloud services from multiple vendors on end user machines of multiple employees at multiple companies.

FIG. 10 brings together elements of FIG. 7, FIG. 8, and FIG. 9 in a block diagram form illustrating the power of the present invention in managing the provisioning and deployment of cloud based services in the MSP environment. The MSP 901 manages IT services for a number of customers 904-906, each with a number of end user machines 907-909, using an RMM system 903. Using the processes described for FIG. 7, FIG. 8, and FIG. 9, an administrator 902 at the MSP 901 can provision cloud services from multiple vendors 910-912 for use by multiple end user machines 907-909 at multiple customers 904-906. The administrator 902 can do this in a single step, interacting with the RMM system 903, and after that the RMM system 903 manages the entire provisioning process through the control panel 913 at the vendors 910-912, with no manual intervention by the administrator 902 or any person at any of the customers 904-906. Once the provisioning is complete, the end user machines 907-909 at the customers 904-906 can use the cloud services at the vendors 910-912 by interacting with the service controller 915 at the vendors 910-912. The service controller 915 then provides the cloud based service by using the database 914 and the service cloud 916.

One aspect of the RMM system 903 that is particularly powerful in this provisioning process is that it is set up to manage the customers 904-906 and the end user machines 907-909 in defined groups, based upon their capabilities and entitlements in the management service. The administrator 902 can use these groups to provide different subsets of services from the vendors 910-912 to different subsets of the customers 904-906, and even to different subsets of end user machines 907-909. This highly automated approach to provisioning provides the MSP 901 with an extremely low effort, organized, and scalable approach to providing these cloud based services to the customers.

In addition, the RMM system 903 can also easily manage changes to the provisioning of the cloud based service. For example, if customer 1 904 no longer wants to pay for the use of the cloud service from vendor 2 911, the administrator 902 can, with a single operation, use the RMM system 903 to remove the provisioning from all the end user machines 907-909 at vendor 2 911, and also remove the provisioning from the end user machines 907-909 themselves.

Figure 11:
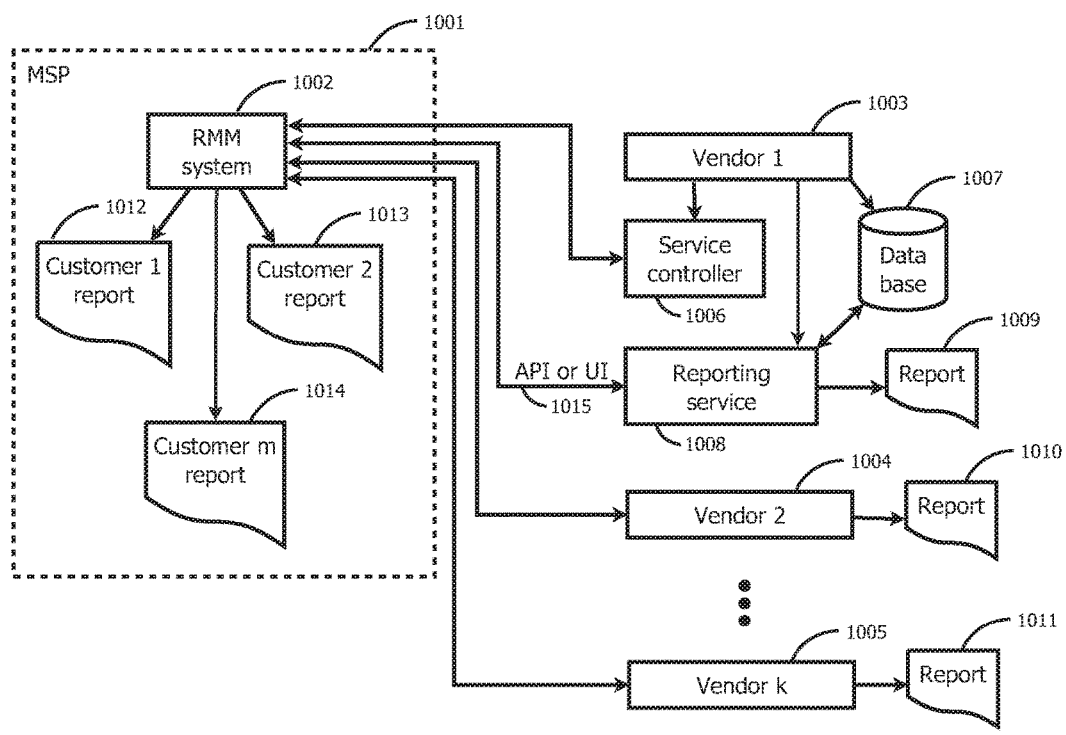
FIG. 11 is a block diagram illustrating one embodiment of the components providing consolidated monitoring and reports for cloud services.

FIG. 11 illustrates yet another powerful aspect of the present invention. The vendors 1003-1005 usually provide a reporting service 1008 that will generate reports 1009-1011 on various parameters of the services. However, the reporting capabilities of the vendors can vary widely, so the reports may not be in the form that the MSP 1001 needs them for the customers of the MSP. For example, the multiple reports 1009-1011 probably do not contain the same information, are formatted differently, and are not categorized in the same way that the MSP is managing the customer systems.

To solve this issue, the RMM system 1002 uses an interface 1015 to the vendor's reporting service 1008, either through an API or by mimicking user interaction through a UI. The reporting service 1008 uses the vendor database 1007 to provide the desired information, and the RMM system accesses the data from all the vendors 1003-1005 through the vendor reporting services. Then, the RMM system 1002 creates customer reports 1012-1014 that can be customized by the MSP 1001 and organized in ways that suit the needs of the customers of the MSP.

In addition, one of the metrics that is of interest to the MSP and customers of the MSP is the availability of the cloud services, in other words, how often they are usable and how often they are not usable. The vendors 1003-1005 may provide some data on this, but the MSP and its customers typically want independent verification of these numbers since contractual obligations can depend on them. The RMM system 1002 can access the service controller 1006 at the vendors 1003-1005 at periodic intervals and run a short test to determine whether or not the cloud service is responding. The RMM system 1002 then keeps a history of the results and uses it to compute the availability of the services of the vendors 1003-1005. These availability statistics can be included in the customer reports 1012-1014.

Figure 12:
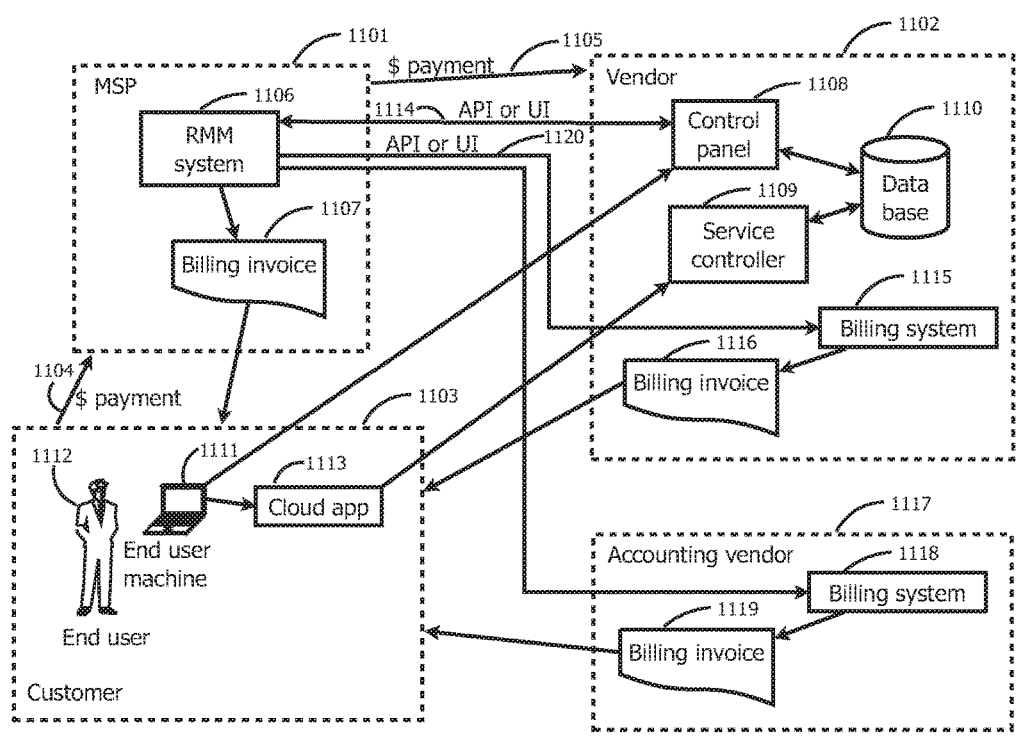
FIG. 12 is a block diagram illustrating one embodiment of the components providing consolidated billing for cloud services.

FIG. 12 illustrates another powerful aspect of the current invention. The customer 1103 may not pay the vendor 1102 directly for the cloud service, but may instead provide payment 1104 to the MSP 1101, which in turn provides payment 1105 to the vendor 1102. There are many reasons for this. For example, the MSP 1101 may receive a discount from the vendor 1102 for aggregating customers. The MSP 1101 may also provide extra services to the customer 1103 for an additional fee that is included in the payment 1104.

The MSP 1101 can use the RMM system 1106 to generate a billing invoice 1107 to send to the customer 1103, which the customer pays 1104. Alternatively, the RMM system 1106 can use the billing system 1115 of the vendor 1102, through an interface 1120 that is either an API or mimics access through a UI, to generate a billing invoice 1116 that goes to the customer 1103, who pays 1104. Alternatively, the MSP 1101 can use the billing system 1118 of a third-party accounting vendor 1117, through an interface 1121 that is either an API or mimics access through a UI, to generate a billing invoice 1119 that goes to the customer 1103, who pays 1104. Any of these billing methods, or any combination of them, will work as long as the RMM system has an accurate picture of the billing for the services that the customer 1103 is using from the vendor 1102. However, the billing may change without involving the MSP 1101. One way this can happen is that an end user 1112 may have direct access to the control panel 1108 to change the service structure in the database 1110 in a way that affects the billing. Another way this can happen is that the cloud app 1113 on the end user machine 1111 may be able to change the service structure in the database 1110 through the service controller 1109 in a way that affects the billing. Another way this can happen is that the cloud app 1113 may use the service controller 1109 in a way that changes the billing for the service as a normal result of the way the service is used. For example, a cloud-based backup solution may charge for the amount of data that is backed up, which can change based on the amount of data stored on the end user machine 1111. The MSP 1101 may not be able to prevent these billing changes, or may not even want to prevent them, since increases in billing by the vendor 1102 may result in increased revenue 1104.

To handle this situation, the RMM system 1106 accesses the control panel 1108 at the vendor 1102 through an interface 1114 that is either an API or mimics access through a UI, and discovers any changes in the service provisioning that have been made by an end user 1112. Then the RMM system 1106 uses this updated information in the billing invoice 1107 to accurately reflect the payment 1105 that the MSP 1101 must pay to the vendor 1102.

Figure 13:
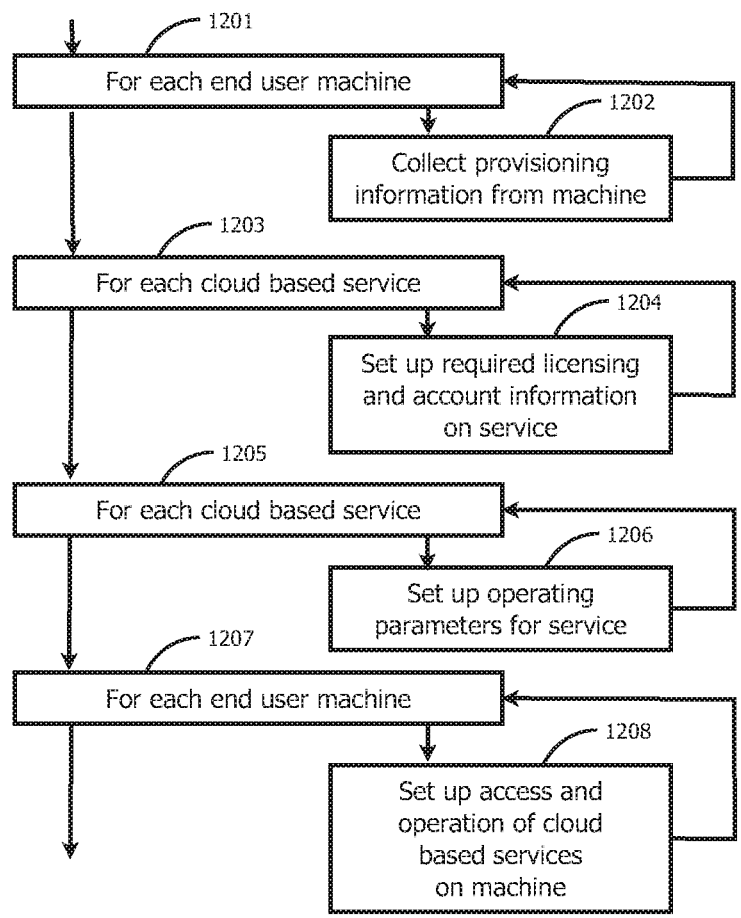
FIG. 13 is a flowchart summarizing the operation of one embodiment of a system for managing cloud-based services.

FIG. 13 is a flowchart summarizing the operation of the RMM system. The system repeats 1201 an operation for each end user machine, the operation 1202 being to collect provisioning information from each machine. The system then repeats 1203 an operation for each cloud based service, the operation 1204 being to set up the required licensing and account information required in order to use the service. Next, the system repeats 1205 an operation for each cloud based service, the operation 1206 being to set up the operating parameters for using the service. Finally, the system repeats 1207 an operation for each end user machine, the operation 1208 being to set up the end user machine to be able to correctly access and use the cloud based services.

In addition to those listed above, there are many facets of the present invention, apparent to one skilled in the art, which have not been described in the detailed embodiment above. These include, but are not limited to: the use of mobile devices by end users; a hierarchical RMM system architecture; a RMM system that provides its own cloud based services; a RMM system that is provided as a cloud based service itself; a direct service from an MSP to end users that does not involve an intermediate customer; and a RMM system that is implemented as a distributed system that does not involve the use of a central RMM server.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for virtualizing audio hardware for one or more virtual machines, it will now become apparent to one of skill in the art that other embodiments incorporating the concepts of the disclosure may be used.

What is claimed is:

1. A method of cloud service invocation for end user machines, comprising:
   receiving, by a server comprising one or more processors and memory, from an end user machine via a computer network, an allocation of a storage resource for a cloud service determined based on an available amount of the storage resource on the end user machine;
   configuring, by the server based on the allocation of the storage resource, a cloud account of the cloud service to indicate one or more features of the cloud service available for use by the end user machine; and
   identifying, by the server, a machine installer customized to include provisioning information based on the allocation and the cloud account;
   transmitting, by the server via the computer network, the machine installer to the end user machine, receipt of the machine installer by the end user machine causing the end user machine to execute the machine installer to use the provisioning information to set up, on the end user machine in accordance with the cloud account, a cloud application corresponding to the cloud service.

2. The method of claim 1, comprising:
   receiving, by the server, from the end user machine, a serial number identifying the end user machine; and
   configuring, by the server, the cloud account of the cloud service based on the serial number.

3. The method of claim 1, comprising:
   receiving, by the server, an account identifier; and
   configuring, by the server, the cloud account of the cloud service based on the account identifier.

4. The method of claim 1, comprising:
   establishing a cloud license based on the cloud account to provide access to the cloud application by the end user machine.

5. The method of claim 1, comprising:
   monitoring availability and performance of a plurality of cloud based services;
   collecting information indicative of the availability and the performance; and
   consolidating the collected information into a consolidated monitoring information stored in memory accessible by the server.

6. The method of claim 1, comprising:
   detecting a change to the cloud account; and
   removing, responsive to the change, the provisioning from the end user machine associated with the cloud account.

7. The method of claim 1, comprising:
   identifying a plurality of end user machines associated with the cloud account; and
   provisioning the cloud application for user by each of the plurality of end user machines.

8. The method of claim 1, comprising:
   identifying a plurality of end user machines associated with the cloud account; and
   transmitting the machine installer to each of the plurality of end user machines, receipt of the machine installer by each of the end user machines causing each of the end user machines to execute the machine installer to use the provisioning information to set up, on the respective each of the plurality of end user machines, and in accordance with the cloud account, the cloud application corresponding to the cloud service.

9. The method of claim 1, comprising:
   providing a user interface to manage information about at least one of:
   a plurality of different kinds of cloud based services;
   a plurality of providers of cloud based services; or
   a plurality of end user machines.

10. The method of claim 1, comprising:
    collecting information for a plurality of cloud based services into a consolidated monitoring information stored in memory accessible by the server, the plurality of cloud based services used by a plurality of end user machine associated with the cloud account; and
    grouping the collected information for presentation to a plurality of companies associated with the plurality of end user machines.

11. A system of cloud service invocation for end user machines, comprising:
    a server comprising one or more processors and memory;
    a collection module executing on the one or more processors of the server that receives, from an end user machine via a computer network, an allocation of a storage resource for a cloud service determined based on an available amount of the storage resource on the end user machine;
    a configuration module executing on the server that configures, based on the allocation of the storage resource, a cloud account of the cloud service to indicate one or more features of the cloud service available for use by the end user machine; and a setup module executing on the server that identifies a machine installer customized to include provisioning information based on the allocation and the cloud account, and transmit via the computer network, the machine installer to the end user machine, receipt of the machine installer by the end user machine causing the end user machine to execute the machine installer to use the provisioning information to set up, on the end user machine in accordance with the cloud account, a cloud application corresponding to the cloud service.

12. The system of claim 11, comprising:
the collection module to receive, from the end user machine, a serial number identifying the end user machine; and
the configuration module to use the serial number to configure the cloud account of the cloud service.

13. The system of claim 11, comprising:
the configuration module to receive an account identifier, and use the account identifier to configure the cloud account of the cloud service.

14. The system of claim 11, wherein the server is further configured to:
establish a cloud license based on the cloud account to provide access to the cloud application by the end user machine.

15. The system of claim 11, wherein the server is further configured to:
monitor availability and performance of a plurality of cloud based services;
collect information indicative of the availability and the performance; and
consolidate the collected information into a consolidated monitoring information stored in memory accessible by the server.

16. The system of claim 11, wherein the server is further configured to:
detect a change to the cloud account; and
remove, responsive to the change, the provisioning from the end user machine associated with the cloud account.

17. The system of claim 11, wherein the server is further configured to:
identify a plurality of end user machines associated with the cloud account; and
provision the cloud application for user by each of the plurality of end user machines.

18. The system of claim 11, wherein the server is further configured to:
identify a plurality of end user machines associated with the cloud account; and
transmit the machine installer to each of the plurality of end user machines, receipt of the machine installer by each of the end user machines causing each of the end user machines to execute the machine installer to use the provisioning information to set up, on the respective each of the plurality of end user machines, and in accordance with the cloud account, the cloud application corresponding to the cloud service.

19. The system of claim 11, comprising:
a management controller executing on the server configured to provide a user interface to manage information about at least one of:
a plurality of different kinds of cloud based services;
a plurality of providers of cloud based services; or
a plurality of end user machines.

20. The system of claim 11, wherein the server is further configured to:
collect information for a plurality of cloud based services into a consolidated monitoring information stored in memory accessible by the server, the plurality of cloud based services used by a plurality of end user machine associated with the cloud account; and
group the collected information for presentation to a plurality of companies associated with the plurality of end user machines.

\* \* \* \* \*